US012611921B2

(12) United States Patent (10) Patent No.: US 12,611,921 B2
Nomura (45) Date of Patent: Apr. 28, 2026

(54) ELECTRIC WORK MACHINE

(71) Applicant: Yanmar Holdings Co., Ltd., Osaka (JP)

(72) Inventor: Kotaro Nomura, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 306 days.

(21) Appl. No.: 18/132,909

(22) Filed: Apr. 10, 2023

(65) Prior Publication Data

US 2023/0339305 A1 Oct. 26, 2023

(30) Foreign Application Priority Data

Apr. 22, 2022 (JP) ................................. 2022-070961

(51) Int. Cl.
*B60K 1/04* (2019.01)
*B60L 50/60* (2019.01)
*B60L 50/64* (2019.01)

(52) U.S. Cl.
CPC ................ *B60K 1/04* (2013.01); *B60L 50/64* (2019.02); *B60L 50/66* (2019.02); *B60L 2200/40* (2013.01)

(58) Field of Classification Search
CPC . B60K 1/04; B60L 50/64; B60L 50/66; B60L 2200/40
USPC ........................................................ 180/68.5
See application file for complete search history.

(56) References Cited

U.S. PATENT DOCUMENTS

| | | | | |
|---|---|---|---|---|
| 9,945,098 | B2 * | 4/2018 | Adachi | ............. H01M 10/6551 |
| 11,235,670 | B2 * | 2/2022 | Yang | ........................ B60L 50/66 |
| 2011/0111649 | A1 * | 5/2011 | Garascia | ........... H01M 10/4257 |
| | | | | 337/414 |
| 2012/0234613 | A1 * | 9/2012 | Miyatake | .......... H01M 10/0481 |
| | | | | 180/65.1 |
| 2013/0071212 | A1 * | 3/2013 | Yunoue | ................. E02F 9/0883 |
| | | | | 414/685 |
| 2013/0313030 | A1 | 11/2013 | Matsumura et al. | |
| 2014/0234062 | A1 | 8/2014 | Adachi et al. | |
| 2016/0099451 | A1 * | 4/2016 | Murai | ................. H01M 50/509 |
| | | | | 429/54 |
| 2019/0119883 | A1 * | 4/2019 | Ichihara | ............. B62D 33/0633 |
| 2021/0114451 | A1 * | 4/2021 | Yamamoto | ............ E02F 9/0891 |
| 2022/0018092 | A1 * | 1/2022 | Kunizawa | ............... E02F 9/166 |

FOREIGN PATENT DOCUMENTS

| | | |
|---|---|---|
| EP | 3361550 A2 | 8/2018 |
| JP | 2018162610 A | 10/2018 |

\* cited by examiner

*Primary Examiner* — Hau V Phan
(74) *Attorney, Agent, or Firm* — Chris Mizumoto

(57) ABSTRACT

A hydraulic excavator as an electric work machine includes an electric motor, a machine-body frame, a battery unit that stores electric power to drive the electric motor, and a fixing mechanism that fixes the battery unit to the machine-body frame. The fixing mechanism has an upper plate and a lower plate that sandwich the battery unit from an up-down direction and a support portion that supports the lower plate on the machine-body frame.

10 Claims, 8 Drawing Sheets

ELECTRIC WORK MACHINE

CROSS-REFERENCE

This application claims foreign priority of JP2022-070961 filed Apr. 22, 2022, the disclosures of which are hereby incorporated by reference in their entirety.

TECHNICAL FIELD

The present invention relates to an electric work machine.

BACKGROUND ART

Conventionally, various types of revolving work machines including electric motors have been proposed. The electric motor is driven by electric power supplied from a battery unit. The battery unit is supported on a revolving platform of the revolving work machine. For example, the revolving work machine of Patent Document 1 has a standing frame that supports the battery unit. The standing frame described above has a first standing portion and a second standing portion. The first standing portion stands on an upper part of the revolving platform and supports one side surface (a left side surface, for example) of the battery unit. The second standing portion stands on the upper part of the revolving platform and supports another side surface (a right side surface, for example) of the battery unit.

PRIOR ART DOCUMENT

Patent Document

Patent Document 1: Japanese Unexamined Patent Application Publication No. 2021-080704

SUMMARY OF INVENTION

Technical Problem

Considering that the revolving work machine is used on an uneven land and vibrates, the battery unit is preferably supported on the revolving platform (machine-body frame) integrally with the standing frame. In the configuration of supporting the battery unit on the revolving platform from a left-right direction as in Patent Document 1, since an upper surface of the battery unit is not supported in any way, integrity of the battery unit and the standing frame is insufficient, and there is room for improvement in terms of stable support of the battery unit against vibration.

The present invention was made in order to solve the above-mentioned problems, and an object thereof is to provide an electric work machine capable of stably supporting a battery unit on a machine-body frame even if vibration occurs.

Solution to Problem

An electric work machine according to one aspect of the present invention includes an electric motor, a machine-body frame, a battery unit that stores electric power to drive the electric motor, and a fixing mechanism that fixes the battery unit to the machined-body frame, in which the fixing mechanism has an upper plate and a lower plate that sandwich the battery unit from an up-down direction and a support portion that supports the lower plate on the machine-body frame.

Advantageous Effects of Invention

The battery unit can be stably supported on the machine-body frame even when vibration occurs.

BRIEF DESCRIPTION OF DRAWINGS

FIG. 2 is a block diagram schematically showing configurations of an electric system and a hydraulic system of the hydraulic excavator.

FIG. 4 is a perspective view of the inside of the engine room when viewed from diagonally rear.

DESCRIPTION OF EMBODIMENTS

An embodiment of the present invention will be explained on the basis of drawings as follows.

1. ELECTRIC WORK MACHINE

Figure 1:
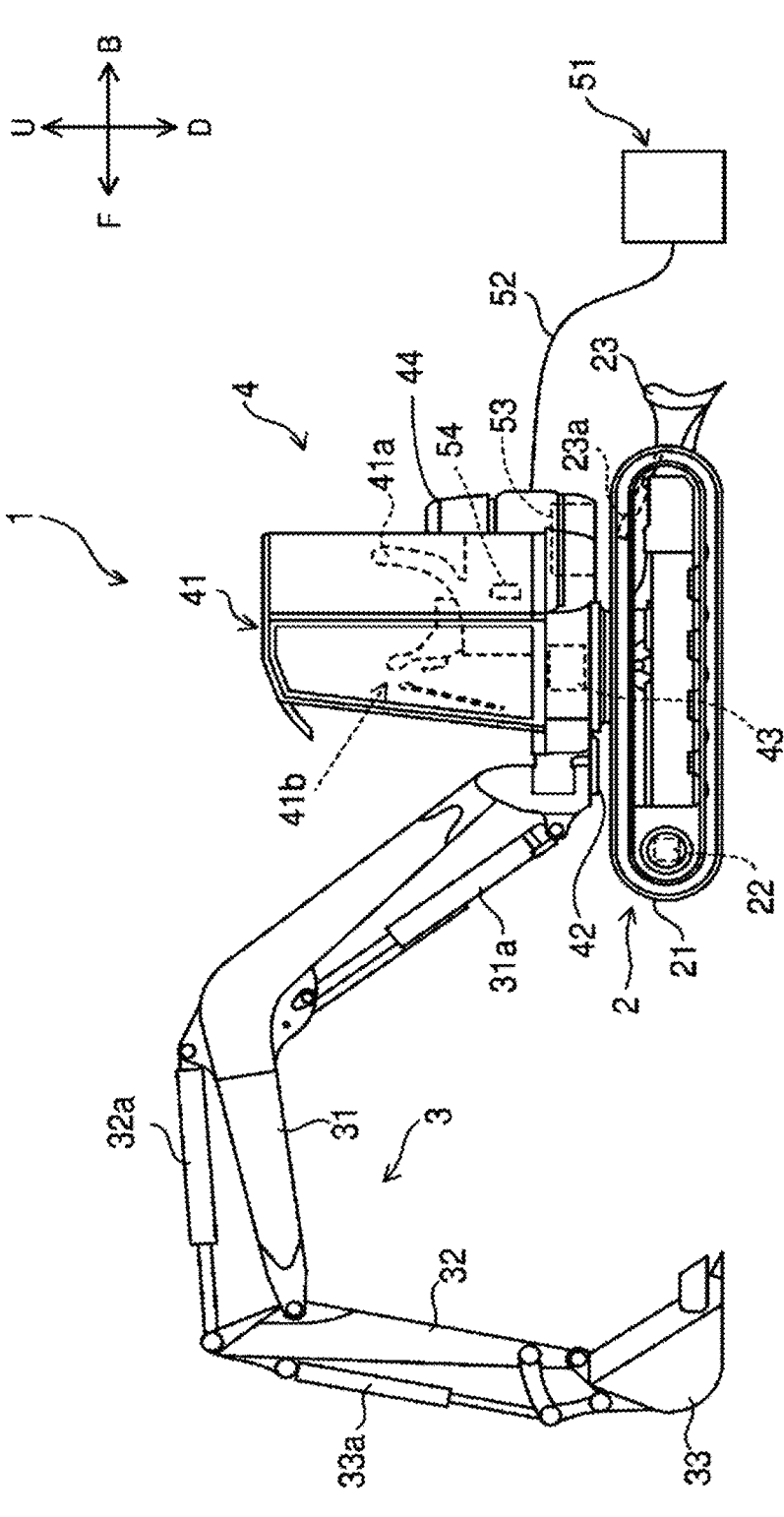
FIG. 1 is a side view showing a schematic configuration of a hydraulic excavator, which is an example of an electric work machine according to an embodiment of the present invention.

FIG. 1 is a side view showing a schematic configuration of a hydraulic excavator 1 (electric excavator), which is an example of an electric work machine, of this embodiment. The hydraulic excavator 1 includes a lower traveling body 2, a work machine 3, and an upper revolving body 4.

Here, directions are defined as follows. A direction in which an operator (manipulator, driver) sitting on a driver's seat 41a of the upper revolving body 4 faces front is referred to as forward, and an opposite direction thereof is referred to as backward. Therefore, when the upper revolving body 4 is in a non-revolving state (revolving angle 0°) relative to the lower traveling body 2, a front-back direction of the upper revolving body 4 matches the direction in which the lower traveling body 2 moves forward and backward. Also, the left side as viewed from the operator seated on the driver's seat 41a is referred to as "left" and the right side as "right". Moreover, a gravity direction perpendicular to the front-back direction and the right-left direction is defined as the up-down direction, with an upstream side of the gravity direction being "up" and a downstream side being "down." In the drawings, the hydraulic excavator 1 is shown with the upper revolving body 4 in a state of non-revolving relative to the lower traveling body 2. Also, in the drawings, forward is indicated by a symbol "F", backward by "B", rightward by "R", leftward by "L", upward by "U", and downward by "D" as necessary.

The lower traveling body 2 comprises a pair of left and right crawlers 21 and a pair of left and right traveling motors 22. Each of the traveling motors 22 is a hydraulic motor. The left and right traveling motors 22 drive the left and right crawlers 21, respectively, whereby the hydraulic excavator 1 can move forward and backward. On the lower traveling body 2, a blade 23 for performing a ground leveling work and a blade cylinder 23*a* are provided. The blade cylinder 23*a* is a hydraulic cylinder that rotates the blade 23 in the up-down direction.

The work machine 3 includes a boom 31, an arm 32, and a bucket 33. The boom 31, the arm 32, and the bucket 33 can be independently driven to perform excavation of earth and sand and the like.

The boom 31 is rotated by a boom cylinder 31*a*. The boom cylinder 31*a* has a base end part of supported by a front portion of the upper revolving body 4 and is movable in an extendable and retractable manner. The arm 32 is rotated by an arm cylinder 32*a*. The arm cylinder 32*a* has a base end part thereof supported by a distal end part of the boom 31 and is movable in the extendable and retractable manner. The bucket 33 is rotated by a bucket cylinder 33*a*. The bucket cylinder 33*a* has a base end part thereof supported by a distal end part of the arm 32 and is movable in the extendable and retractable manner. The boom cylinder 31*a*, the arm cylinder 32*a*, and the bucket cylinder 33*a* are constituted of hydraulic cylinders.

The upper revolving body 4 is located above the lower traveling body 2 and provided capable of revolving with respect to the lower traveling body 2 through a revolving bearing (not shown). In the upper revolving body 4, an operation portion 41, a revolving frame 42, a revolving motor 43, an engine room 44 and the like are disposed. The upper revolving body 4 is driven by the revolving motor 43, which is a hydraulic motor, to revolve through the revolving bearing. The hydraulic excavator 1 includes the revolving frame 42 as the machine-body frame.

A hydraulic pump 71 (see FIG. 2) is disposed on the upper revolving body 4. The hydraulic pump 71 is driven by an electric motor 61 (see FIG. 2) inside the engine room 44. The hydraulic pump 71 supplies hydraulic oil (pressure oil) to the hydraulic motors (the left and right traveling motors 22, the revolving motor 43, for example), and the hydraulic cylinders (the blade cylinder 23*a*, the boom cylinder 31*a*, the arm cylinder 32*a*, the bucket cylinder 33*a*, for example). The hydraulic motors and the hydraulic cylinders that are driven with the hydraulic oil supplied from the hydraulic pump 71 are collectively referred to as a hydraulic actuator 73 (see FIG. 2).

The driver's seat 41*a* is disposed in the operation portion 41. Various levers 41*b* are disposed around the driver's seat 41*a*. When the operator sitting on the driver's seat 41*a* operates the lever 41*b*, the hydraulic actuator 73 is driven. This allows the lower traveling body 2 to travel, the blade 23 to perform the ground leveling work, the work machine 3 to perform an excavating work, and the upper revolving body 4 to revolve and the like.

A battery unit 53 is disposed on the upper revolving body 4. That is, the hydraulic excavator 1 includes the battery unit 53. The battery unit 53 is constituted by a lithium-ion battery unit, for example, and stores electric power to drive the electric motor 61. The battery unit 53 may be constituted by a plurality of batteries as a unit or may be constituted of a single battery cell. Moreover, in the upper revolving body 4, a power feed port, not shown, is provided. The power feed port described above and a commercial power supply 51 as an external power source are connected via a power feed cable 52. This allows the battery unit 53 to be charged.

In the upper revolving body 4, a lead battery 54 is further provided. The lead battery 54 outputs a low voltage (12 V, for example) direct-current voltage. The output from the lead battery 54 is supplied as a control voltage to, for example, a system controller 67 (see FIG. 2), a blower fan (not shown) and the like.

The hydraulic excavator 1 may be so configured that a hydraulic instrument such as a hydraulic actuator 73 and an electrically-driven actuator are used in combination. The electrically-driven actuators include, for example, an electric traveling motor, an electric cylinder, and an electric revolving motor.

2. CONFIGURATIONS OF ELECTRIC SYSTEM AND HYDRAULIC SYSTEM

Figure 2:
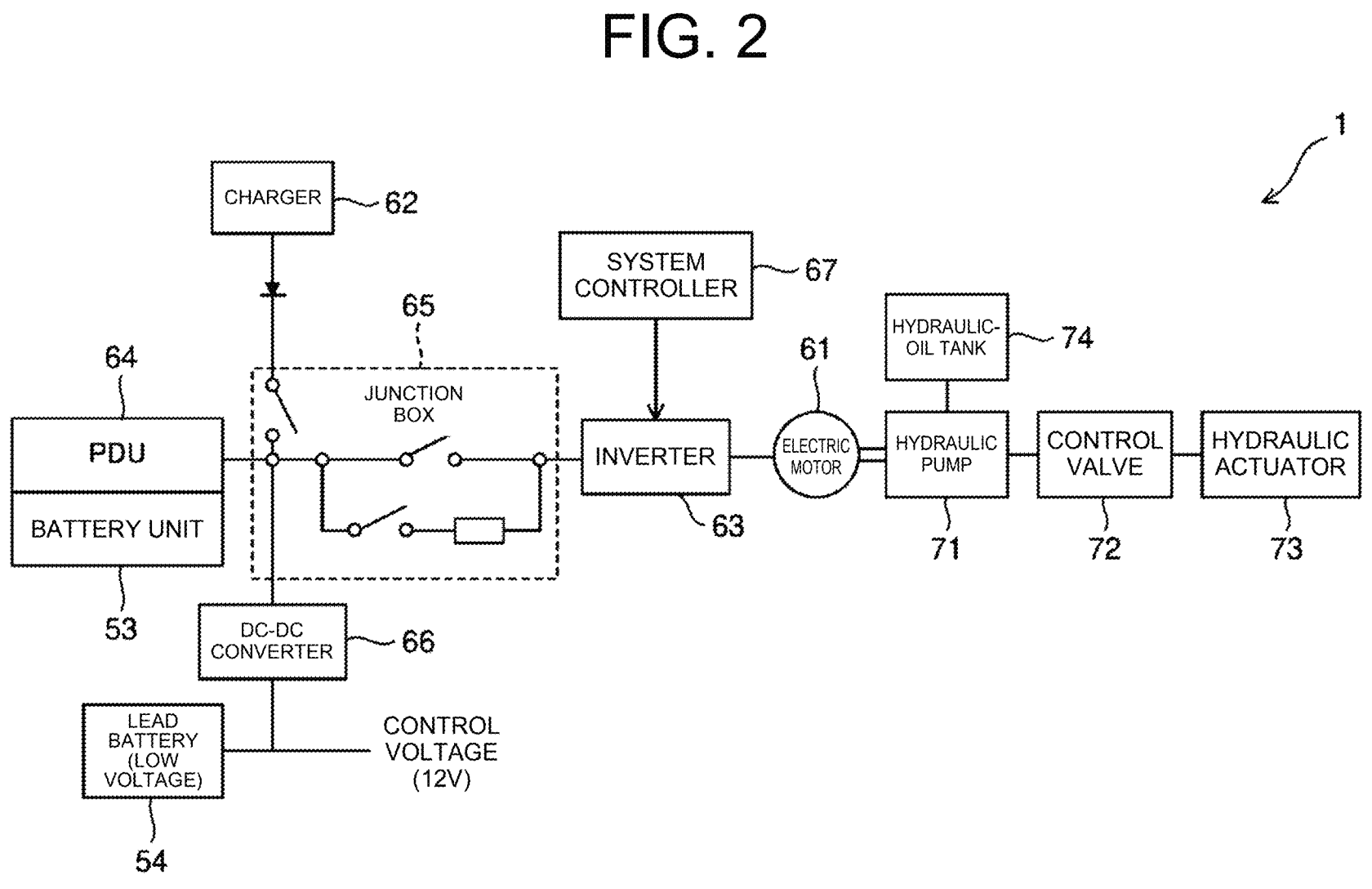

FIG. 2 is a block diagram schematically showing configurations of an electric system and a hydraulic system of the hydraulic excavator 1. The hydraulic excavator 1 includes the electric motor 61, a charger 62, an inverter 63, a PDU (Power Drive Unit) 64, a junction box 65, a DC-DC converter 66, and the system controller 67. The system controller 67 is constituted by an electronic control unit, also called an ECU (Electronic Control Unit) and electrically controls each portion of the hydraulic excavator 1.

The electric motor 61 is driven by electric power supplied from the battery unit 53 via the junction box 65 and the inverter 63. The electric motor 61 is constituted by a permanent magnet motor or an induction motor. The electric motor 61 is disposed on the revolving frame 42.

The charger 62 converts an AC voltage supplied from the commercial power supply 51 shown in FIG. 1 via the power feed cable 52 into a DC voltage. The inverter 63 converts the DC voltage supplied from the battery unit 53 into an AC voltage and supplies it to the electric motor 61. As a result, the electric motor 61 is rotated. The supply of the AC voltage (current) from the inverter 63 to the electric motor 61 is performed on the basis of a rotation instruction output from the system controller 67.

The PDU 64 is a battery control unit that controls input/output of the battery unit 53 by controlling a battery relay inside. The junction box 65 is configured by including a charger relay, an inverter relay, a fuse and the like. The voltage output from the charger 62 is supplied to the battery unit 53 through the junction box 65 and the PDU 64. Moreover, the voltage output from the battery unit 53 is supplied to the inverter 63 through the PDU 64 and the junction box 65.

The DC-DC converter 66 lowers a high-voltage (300 V, for example) direct-current voltage supplied from the battery unit 53 through the junction box 65 to a low voltage (12 V, for example). The voltage output from the DC-DC converter 66 is, similarly to the output from the lead battery 54, supplied to the system controller 67, the blower fan, and the like.

A plurality of the hydraulic pumps 71 are connected to a rotary shaft (output shaft) of the electric motor 61. The plurality of hydraulic pumps 71 include a variable-capacity pump and a fixed-capacity pump. FIG. 2 shows only one of the hydraulic pumps 71 as an example. Each hydraulic pump 71 is connected to a hydraulic-oil tank 74 that contains (stores) the hydraulic oil. The hydraulic pump 71 causes the hydraulic oil in the hydraulic-oil tank 74 to be supplied to the hydraulic actuator 73 through a control valve 72. As a result, the hydraulic actuator 73 is driven. The control valve 72 is a direction-switching valve that controls a flow direction and a flow rate of the hydraulic oil supplied to the hydraulic actuator 73.

3. FIXING OF BATTERY UNIT

Figure 3:
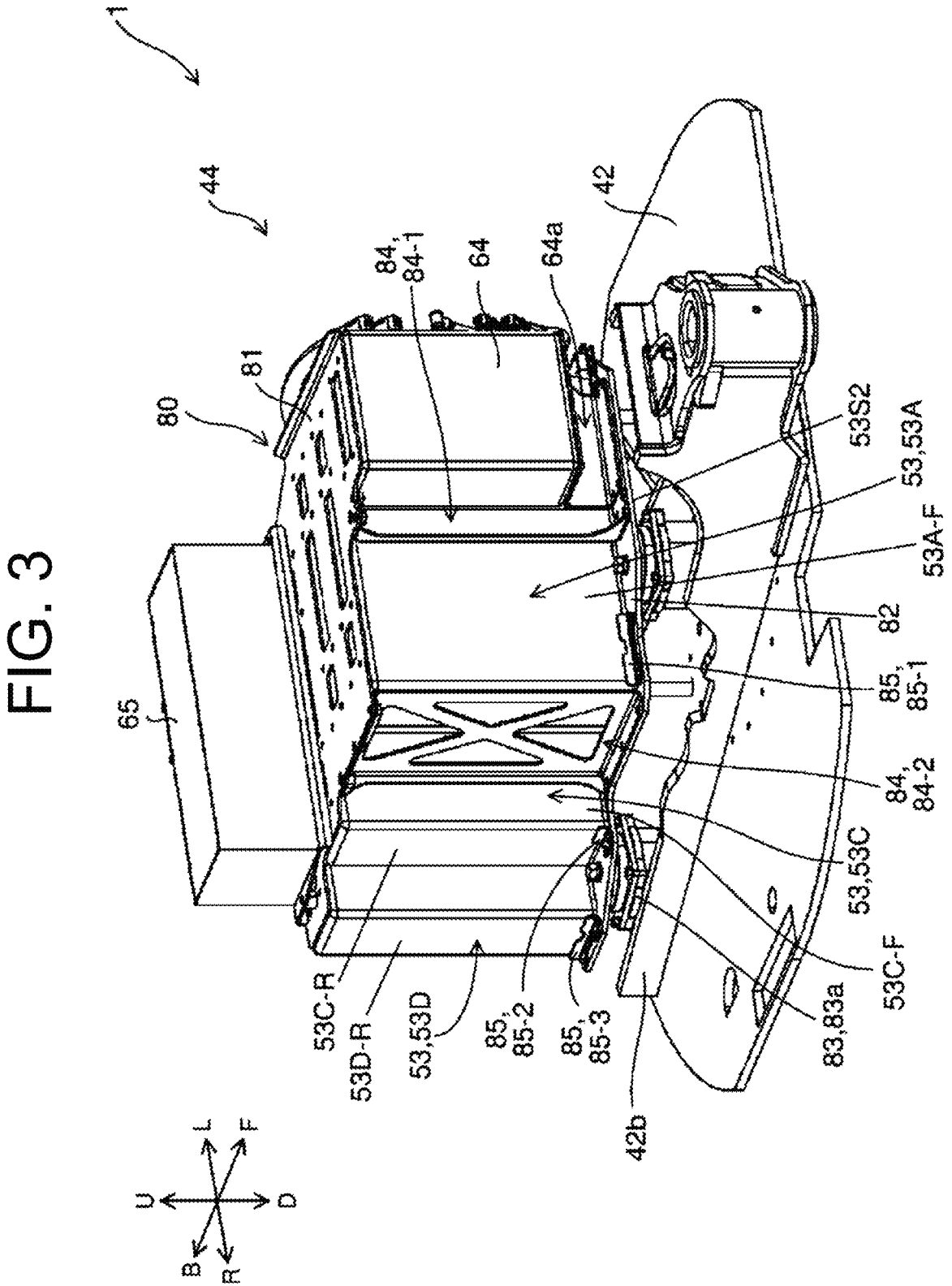
FIG. 3 is a perspective view of an inside of an engine room of the hydraulic excavator when viewed from diagonally front.
Figure 4:
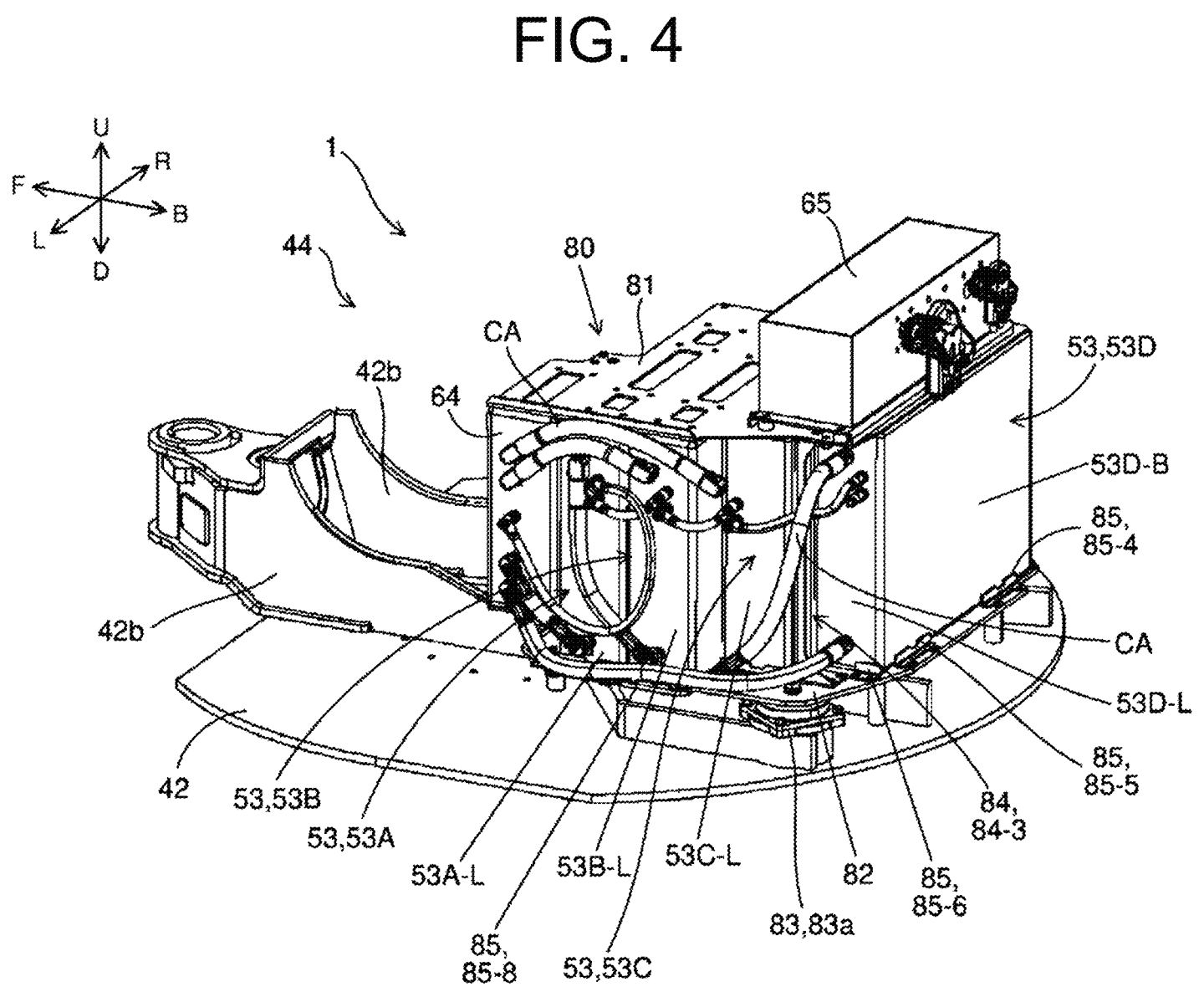

Subsequently, a fixing mechanism of the battery unit 53 described above will be explained. FIG. 3 is a perspective view of an inside of the engine room 44 of the hydraulic excavator 1 when viewed from diagonally front. FIG. 4 is a perspective view of the inside of the engine room 44 when viewed from diagonally rear.

As shown in these figures, the hydraulic excavator 1 includes a fixing mechanism 80. The fixing mechanism 80 is a mechanism that fixes the battery unit 53 to the revolving frame 42. In this embodiment, the hydraulic excavator 1 includes a plurality of battery units 53. Thus, the fixing mechanism 80 fixes the plurality of battery units 53 to the revolving frame 42.

The fixing mechanism 80 has an upper plate 81 as well as a lower plate 82 and a support portion 83. The upper plate 81 and the lower plate 82 sandwich the plurality of battery units 53 from the up-down direction. The upper plate 81 and lower plate 82 are coupled by a coupling member 84, described below.

The upper plate 81 is located above the plurality of battery units 53. The lower plate 82 is located below the plurality of battery units 53. The plurality of battery units 53 and PDU 64 are connected by a connecting cable CA. In particular, the plurality of battery units 53 are connected in series, parallel, or a combination of series and parallel.

Figure 5:
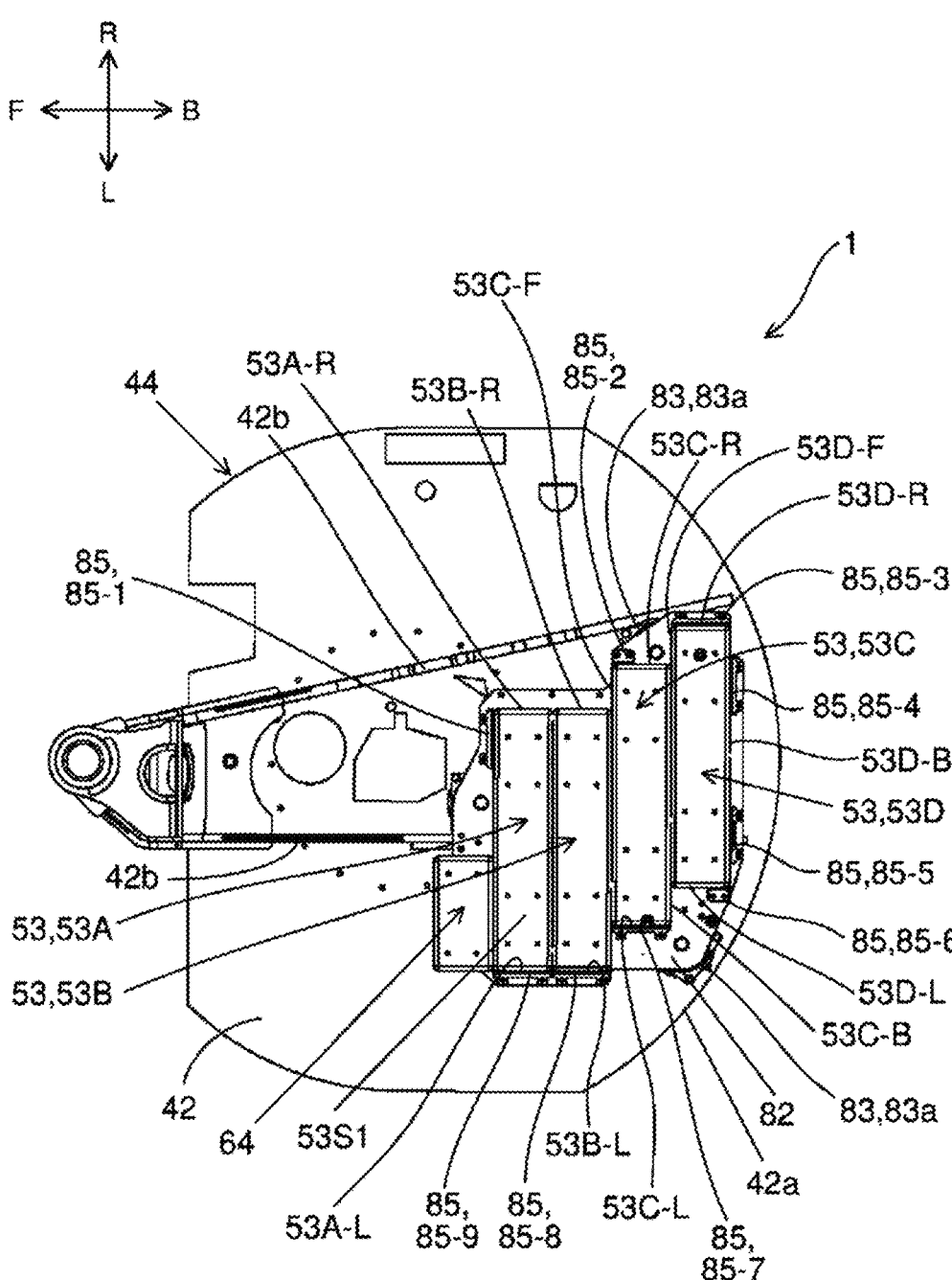
FIG. 5 is a plan view showing disposition of the battery unit on the lower plate.

FIG. 5 is a plan view showing the disposition of the battery unit 53 on the lower plate 82 in a state where the upper plate 81, the coupling member 84, and connecting cable CA are removed. Four units of the battery units 53 of the same size are disposed on the lower plate 82. For example, two units of the battery units 53 are connected in series so as to form one pair, and the other two battery units 53 are also connected in series so as to form one pair. Each pair is then connected in parallel with each other. The connection method of the four battery units is not limited to the above example. The number of the battery units 53 is not limited to four described above, and at least one battery unit 53 needs to be provided.

In this embodiment, the plurality of battery units 53 are located in parallel to one direction and aligned perpendicular to one direction on the lower plate 82. In this embodiment, the plurality of battery units 53 are located in parallel to the left-right direction as the one direction described above and aligned in the front-back direction perpendicular to the one direction described above on the lower plate 82, for example.

Here, when the above four battery units 53 are to be specifically distinguished, they are referred to as a first battery unit 53A, a second battery unit 53B, a third battery unit 53C, and a fourth battery unit 53D in order from front to back. The PDU 64 described above is located in front of the first battery unit 53A. A lower surface of the PDU 64 is fixed to a support stay 64a (see FIG. 3). The support stay 64a is fixed on the lower plate 82.

As shown in FIG. 5, the first battery unit 53A and the second battery unit 53B are disposed at the same position in the left-right direction (without being shifted from each other in the left-right direction) on the lower plate 82. The third battery unit 53C is disposed on the lower plate 82 by being shifted to the right more than the second battery unit 53B. The fourth battery unit 53D is disposed further shifted to the right on the lower plate 82 than the third battery unit 53C.

Therefore, it can be considered that two of the four battery units 53 (the third battery unit 53C and the fourth battery unit 53D) are located on the lower plate 82 shifted in one direction (left-right direction) from the other battery units 53 (first battery unit 53A and the second battery unit 53B). Only one of the plurality of battery units 53 may be located by being shifted in one direction. In other words, in this embodiment, at least one of the plurality of battery units 53 is located on the lower plate 82, by being shifted from the other battery units 53 in one direction.

In the disposition of the plurality of battery units 53 as above, left end parts of the first battery unit 53A to the fourth battery unit 53D are located substantially along an edge portion 42a (see FIG. 5) from a left side part to a rear end part of the revolving frame 42. As described above, a space in the engine room 44 is effectively utilized by disposing each of the battery units 53 in the engine room 44 as close as possible to the edge portion 42a of the revolving frame 42.

From the viewpoint of improving integrity of each battery unit 53 with the upper plate 81 and the lower plate 82, an upper surface 53S1 (see FIG. 5) of each battery unit 53 is preferably fixed in contact with the upper plate 81 (see FIG. 3), and a lower surface 53S2 (see FIG. 3) of each battery unit 53 is preferably fixed in contact with the lower plate 82.

From the viewpoint of facilitating replacement of each battery unit 53 due to life span, an operation failure and the like, fixing of the upper surface 53S1 of each battery unit 53 to the upper plate 81 and the fixing of the lower surface 53S2 of each battery unit 53 to the lower plate 82 are preferably performed by fastening by a bolt. In the case of bolt fastening, release of the fixation between the both is also easy.

Each battery unit 53 may be disposed on the lower plate 82 in parallel to the front-back direction and aligned in the left-right direction. Each battery unit 53 may also be disposed on the lower plate 82 in parallel to a diagonal direction that intersects the left-right direction and aligned in a direction perpendicular to the diagonal direction. Furthermore, each battery unit 53 may be disposed by being stacked vertically on the lower plate 82.

The support portion 83 supports the lower plate 82 on the revolving frame 42. Three support portions 83 are provided on the revolving frame 42, for example. In other words, the lower plate 82 is supported by the three support portions 83 on the revolving frame 42. The number of support portions 83 is not particularly limited to the three described above.

As an anti-vibration measure for each battery unit 53, a vibration isolating rubber or the like may be disposed between each battery unit 53 and the lower plate 82. However, from the viewpoint of giving priority to improvement of integrity of each battery unit 53 and the lower plate 82 and fixing the lower surface 53S2 of each battery unit 53 in direct contact with the lower plate 82, the support portion 83 located below the lower plate 82 is preferably configured by including a vibration isolating member 83a. As the vibration isolating member 83a, a vibration isolating structure combining the vibration isolating rubber, a stay, a housing and the like can be used.

In the configuration in which (a plurality of) the battery units 53 are sandwiched between the upper plate 81 and the lower plate 82 from the up-down direction as in this embodiment, the upper surfaces 53S1 and the lower surfaces 53S2 of the battery units 53 are supported by the upper plate 81 and the lower plate 82 and thus, the integrity of the battery units 53 and the upper plate 81 and the lower plate 82 can be improved. As a result, the battery unit 53 can be stably supported on the revolving frame 42 through the lower plate 82 and the support portion 83, even when vibrations occur during use of the hydraulic excavator 1. The support portion 83 also allows the fixing mechanism 80 to be installed by avoiding (straddling) interference with a strength structural member 42b (see FIGS. 3 to 5) of the revolving frame 42.

The strength structural member 42*b* is a reinforcing plate material of the revolving frame 42 installed across the front and back on the revolving frame 42.

As shown in FIGS. 3 and 4, the fixing mechanism 80 has a coupling member 84. The coupling member 84 is a member that couples the upper plate 81 and the lower plate 82. From the viewpoint of strongly sandwiching the battery unit 53 between the upper plate 81 and the lower plate 82 from the up-down direction and from the viewpoint of reducing a load applied to a contact part (part fastened by a bolt) between the battery unit 53 and the upper plate 81 when the upper plate 81 bolted to the battery unit 53 is lifted up to move the battery unit 53 in a plant or the like, it is preferable that the upper plate 81 and the lower plate 82 are coupled by the coupling member 84 as in this embodiment.

In this embodiment, the fixing mechanism 80 has a first coupling member 84-1 (see FIG. 3), a second coupling member 84-2 (see FIG. 3), and a third coupling member 84-3 (see FIG. 4) as the coupling members 84 described above. The number of the coupling members 84 is not limited to the three described above.

Figure 6:
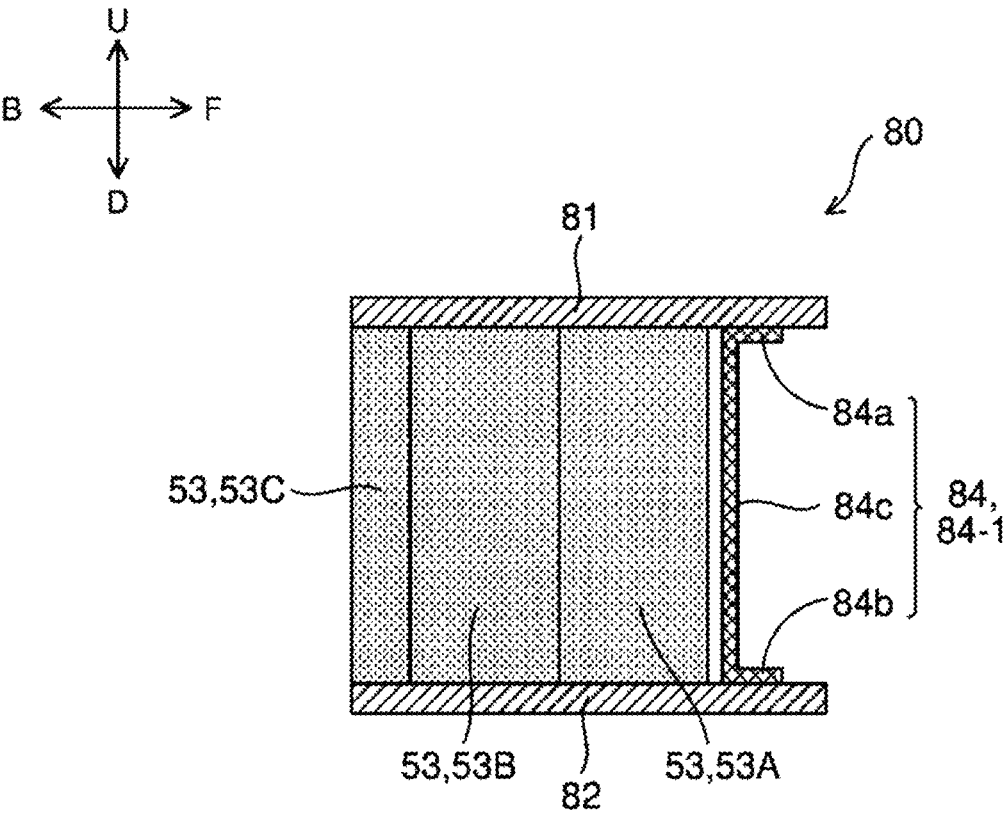
FIG. 6 is a sectional view of a first coupling member.
Figure 7:
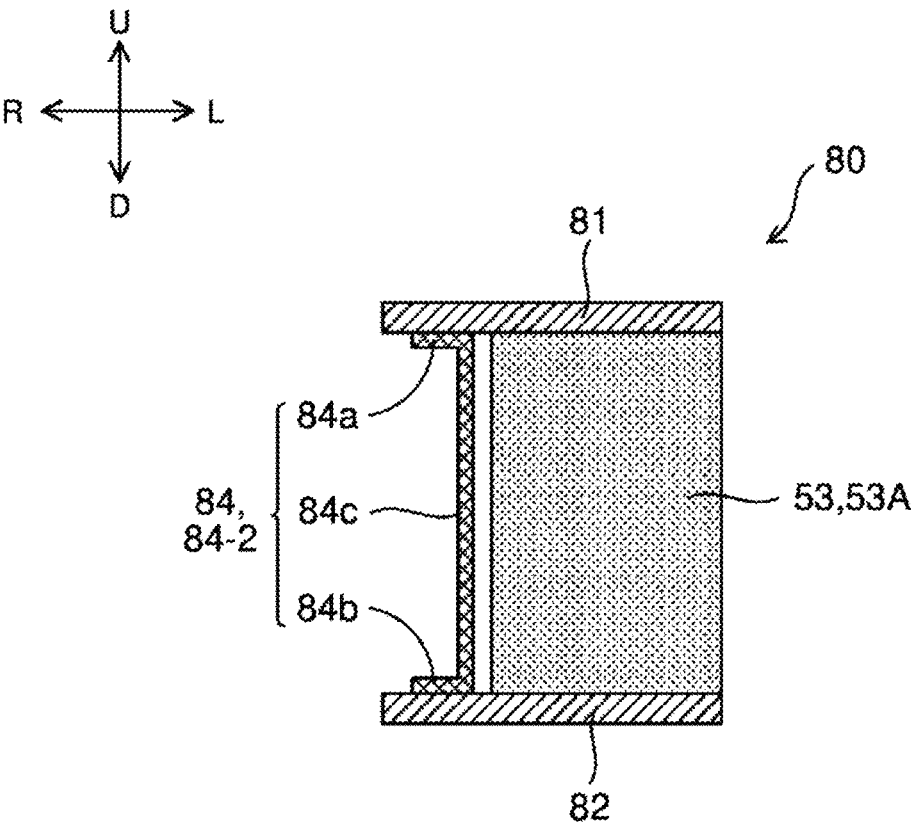
FIG. 7 is a sectional view of a second coupling member.
Figure 8:
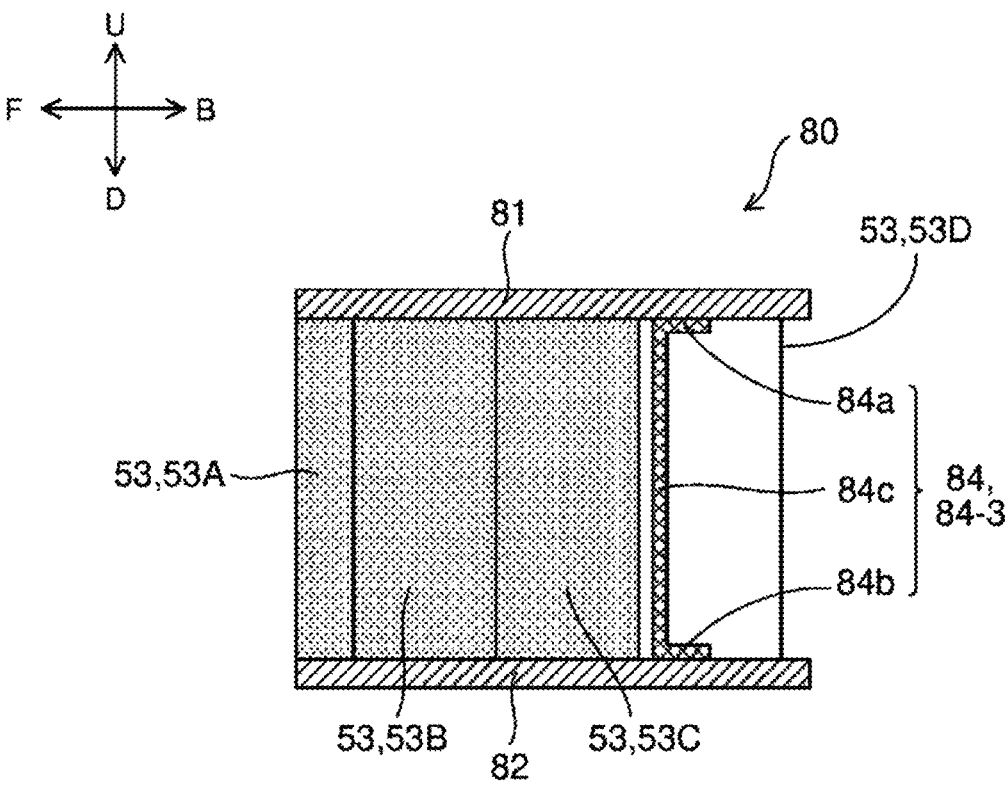
FIG. 8 is a sectional view of a third coupling member.

FIG. 6 is a cross-sectional view of the first coupling member 84-1. FIG. 7 is a cross-sectional view of the second coupling member 84-2. FIG. 8 is a cross-sectional view of the third coupling member 84-3. Each coupling member 84 is constituted by having an upper-plate fixing portion 84*a*, a lower-plate fixing portion 84*b*, and a coupling portion 84*c*.

The upper-plate fixing portion 84*a* is constituted by a flat plate located below the upper plate 81 and is fastened to the upper plate 81 by bolts. The lower-plate fixing portion 84*b* is constituted by a flat plate located above the lower plate 82 and is fastened to the lower plate 82 by bolts. The coupling portion 84*c* is constituted integrally with the upper-plate fixing portion 84*a* and the lower-plate fixing portion 84*b* and couples the upper-plate fixing portion 84*a* and the lower-plate fixing portion 84*b* in the up-down direction.

The coupling portion 84*c* is located horizontally (left-right direction or front-back direction) with a gap from the battery unit 53. Thus, the coupling member 84 is located away from the battery unit 53.

From the viewpoint of increasing heat radiation efficiency of each battery unit 53, the coupling member 84 preferably couples the upper plate 81 and the lower plate 82 at a position away from the battery unit 53, as shown in FIGS. 6 to 8.

Moreover, from the viewpoint of coupling the upper plate 81 and the lower plate 82, which sandwich the plurality of battery units 53 from the up-down direction, in a well-balanced manner, and from the viewpoint of stably suspending an integral unit (fixed unit) with the plurality of battery units 53 sandwiched between the upper plate 81 and the lower plate 82 in a plant, for example, the upper plate 81 and the lower plate 82 are preferably coupled by the coupling member 84 at least at three locations in a periphery of the plurality of battery units 53. In order to realize this configuration, as shown in FIGS. 3 and 4, the first coupling member 84-1, the second coupling member 84-2, and the third coupling member 84-3 are preferably located away from each other along an outer periphery surrounding the plurality of battery units 53, viewed from above.

Moreover, from the viewpoint of coupling the upper plate 81 and the lower plate 82 by the three coupling members 84 in a well-balanced manner and of preventing the plurality of battery units 53 from collapsing in the front-back direction, the first coupling member 84-1, the second coupling member 84-2, and the third coupling member 84-3 are preferably located on the lower plate 82 as follows.

In other words, as shown in FIGS. 3 and 4, it is preferable that the first coupling member 84-1 is located in front of the first battery unit 53A, which is located at the most front among the plurality of battery units 53, the second coupling member 84-2 is located behind the first coupling member 84-1 and opposing each side surface of two or more adjacent battery units 53, and the third coupling member 84-3 is located behind the second coupling member 84-2, and with the plurality of battery units 53 (the first battery unit 53A to the third battery unit 53C, for example) interposed between the third coupling member 84-3 and the first coupling member 84-1.

In this embodiment, as shown in FIG. 5, the first battery unit 53A as well as the second battery unit 53B and the third battery unit 53C are located on the lower plate 82, shifted in one direction (left-right direction). In this configuration, the second coupling member 84-2 (see FIG. 3) is located on the lower plate 82 and adjacent to both a right side surface 53A-R of the first battery unit 53A as well as a right side surface 53B-R of the second battery unit 53B and a front surface 53C-F of the third battery unit 53C. The right side surface 53A-R as well as the right side surface 53B-R and the front surface 53C-F described above have a perpendicularly intersecting positional relationship on the lower plate 82.

Moreover, in this embodiment, the third battery unit 53C and the fourth battery unit 53D are located on the lower plate 82, shifted in the left-right direction. In this configuration, the third coupling member 84-3 (see FIG. 4) is located adjacent to both the rear surface 53C-B of the third battery unit 53C and the left side surface 53D-L of the fourth battery unit 53D on the lower plate 82. The rear surface 53C-B and the left side surface 53D-L described above have a positional relationship of perpendicularly intersecting on the lower plate 82.

In the configuration in which the adjacent two battery units 53 are located by being shifted from each other in one direction (left-right direction, for example) on the lower plate 82 as in this embodiment, when the fixing mechanism 80 has a plurality of the coupling members 84, from the viewpoint of effectively utilizing a free area on the lower plate 82 (the remaining area excluding the area where the battery unit 53 is disposed), at least any one of the plurality of coupling members 84 is preferably disposed on the lower plate 82 as follows. In other words, at least any one of the plurality of coupling members 84 is preferably located adjacently to two perpendicularly intersecting surfaces of the two battery units 53 that are located by being shifted in one direction on the lower plate 82, viewed from above.

The fixing mechanism 80 of this embodiment further has a positioning member 85, as shown in FIG. 3 and FIG. 4. The positioning member 85 is fixed on the lower plate 82. Moreover, the positioning member 85 is located on the lower plate 82 in contact with a bottom of any surface of the battery unit 53.

For example, the fixing mechanism 80 has, as the positioning members 85, a first positioning member 85-1, a second positioning member 85-2, a third positioning member 85-3, a fourth positioning member 85-4, a fifth positioning member 85-5, a sixth positioning member 85-6, a seventh positioning member 85-7, an eighth positioning member 85-8, and a ninth positioning member 85-9.

As shown in FIG. 3, the first positioning member 85-1 is located on the lower plate 82 in contact with the bottom of the front surface 53A-F of the first battery unit 53A. The second positioning member 85-2 is located on the lower plate 82 in contact with the bottom of the right side surface 53C-R of the third battery unit 53C. The third positioning member 85-3 is located on the lower plate 82 in contact with the bottom of the right side surface 53D-R of the fourth battery unit 53D.

As shown in FIG. 4, the fourth positioning member 85-4 and the fifth positioning member 85-5 are located on the lower plate 82 in contact with the bottom of the rear surface 53D-B of the fourth battery unit 53D. The sixth positioning member 85-6 is located on the lower plate 82 in contact with the bottom of the left side surface 53D-L of the fourth battery unit 53D. The seventh positioning member 85-7 is located on the lower plate 82 in contact with the bottom of the left side surface 53C-L of the third battery unit 53C. The eighth positioning member 85-8 is located on the lower plate 82 in contact with the bottom of the left side surface 53B-L of the second battery unit 53B. The ninth positioning member 85-9 is located on the lower plate 82 in contact with the bottom of the left side surface 53A-L of the first battery unit 53A.

From the viewpoint of reducing a risk of a positional shift of the battery unit 53 with respect to the lower plate 82 and of fixing the battery unit 53 at an appropriate position (by bolts, for example) on the lower plate 82, the fixing mechanism 80 preferably has the positioning member 85 described above.

As shown in FIG. 3 and FIG. 4, the junction box 65 described above is disposed on the upper plate 81 in this embodiment. The junction box 65 is a type of an electrical component. From the viewpoint of effective utilization of the space above the upper plate 81, it is preferable that the electrical components are disposed on the upper plate 81, that is, that the hydraulic excavator 1 includes electrical components that are disposed on the upper plate 81. The electrical components disposed on the upper plate 81 are not limited to the junction box 65 described above but may be other electrical components such as the PDU 64.

4. APPENDICES

The hydraulic excavator 1 described in this embodiment can also be expressed as an electric work machine as shown in the following Appendix.

The electric work machine of Appendix (1) includes an electric motor, a machine-body frame, a battery unit that stores electric power to drive the electric motor, and a fixing mechanism that fixes the battery unit to the machine-body frame, the fixing mechanism having an upper plate and a lower plate that sandwich the battery unit from the up-down direction and a support portion that supports the lower plate on the machine-body frame.

In the electric work machine of Appendix (2), the support portion includes a vibration isolating member in the electric work machine described in Appendix (1).

In the electric work machine of Appendix (3), in the electric work machine described in Appendix (1) or (2), an upper surface of the battery unit is fixed in contact with the upper plate and a lower surface of the battery unit is fixed in contact with the lower plate.

In the electric work machine of Appendix (4), in the electric work machine described in any one of Appendices (1) to (3), the fixing mechanism has a coupling member, and the coupling member couples the upper plate and the lower plate.

In the electric work machine of Appendix (5), in the electric work machine described in Appendix (4), the coupling member couples the upper plate and the lower plate at a position away from the battery unit.

In the electric work machine of Appendix (6), in the electric work machine described in Appendix (4) or (5), the upper plate and the lower plate sandwich a plurality of the battery units from the up-down direction, the plurality of battery units are located in parallel to one direction on the lower plate and aligned in a direction perpendicular to the one direction, at least any one of the plurality of battery units is located on the lower plate by being shifted from the other battery units in the one direction, and the fixing mechanism has a plurality of the coupling members, at least any one of the plurality of coupling members is located adjacently to two perpendicularly intersecting surfaces of the two battery units that are located by being shifted in the one direction on the lower plate, viewed from above.

In the electric work machine of Appendix (7), in the electric work machine described in Appendix (6), the fixing mechanism has a first coupling member, a second coupling member, and a third coupling member as the coupling members, and the first coupling member, the second coupling member, and the third coupling member are located away from each other along an outer periphery surrounding a plurality of the battery units, viewed from above.

In the electric work machine of Appendix (8), in the electric work machine described in Appendix (7), a plurality of the battery units are located on the lower plate in parallel to a left-right direction as the one direction and aligned in a front-back direction perpendicular to the one direction, the first coupling member is located in front of a battery unit located at the most front among a plurality of the battery units, the second coupling member is located behind the first coupling member and opposing each side surface of two or more adjacent battery units, and the third coupling member is located behind the second coupling member, and with the plurality of battery units interposed between the first coupling member and the third coupling member.

In the electric work machine of Appendix (9), in the electric work machine described in any one of Appendices (1) to (8), the fixing mechanism further has a positioning member fixed on the lower plate, and the positioning member is located on the lower plate in contact with a bottom of any surface of the battery unit.

The electric work machine of Appendix (10) further includes electrical components disposed on the upper plate of the electric work machine described in any one of Appendices (1) to (9).

5. SUPPLEMENTAL DESCRIPTION

In this embodiment, a size (a length in one direction, for example) of each battery unit 53 is all the same, but some of the battery units 53 with a different size may be used.

The description has been made with the hydraulic excavator 1, which is a construction machine, as the example of the electric work machine, but the electric work machine is not limited to the hydraulic excavator 1 and may be any other construction machines such as a wheel loader. Also, the electric work machine may be an agricultural machine such as a combine harvester, a tractor or the like.

The embodiment of the present invention has been described above, but the scope of the present invention is not limited thereto, but can be worked with extension or modification within a range without departing from the gist of the invention.

INDUSTRIAL APPLICABILITY

The present invention is applicable to work machines such as a construction machine and an agricultural machine, for example.

REFERENCE SIGNS LIST

1 Hydraulic excavator (electric work machine)
42 Revolving frame (machine-body frame)
53 Battery unit
53A First battery unit (battery unit)
53B Second battery unit (battery unit)
53C Third battery unit (battery unit)
53D Fourth battery unit (battery unit)
53S1 Upper surface
53S2 Lower surface
61 Electric motor
65 Junction box (electrical components)
80 Fixing Mechanism
81 Upper plate
82 Lower plate
83 Support portion
83a Vibration isolating member
84 Coupling member
84-1 First coupling member
84-2 Second coupling member
84-3 Third coupling member
85 Positioning member
85-1 First positioning member
85-2 Second positioning member
85-3 Third positioning member
85-4 Fourth positioning member
85-5 Fifth positioning member
85-6 Sixth positioning member
85-7 Seventh positioning member
85-8 Eighth positioning member
85-9 Ninth positioning member

The invention claimed is:

1. An electric work machine, comprising:
an electric motor;
a machine-body frame;
a battery unit that stores electric power to drive the electric motor; and
a fixing mechanism that fixes the battery unit to the machine-body frame, wherein the fixing mechanism has:
an upper plate and a lower plate that directly sandwich the battery unit from an up-down direction;
a support portion that supports the lower plate on the machine-body frame, and
a coupling member that couples the upper plate and lower plate, wherein
the coupling member comprises:
an upper-plate fixing portion; and
a lower-plate fixing portion, wherein
the upper-plate fixing portion is located directly below the upper plate and the lower-plate fixing portion is located directly above the lower plate.

2. The electric work machine according to claim 1, wherein the support portion includes a vibration isolating member.

3. The electric work machine according to claim 1, wherein an upper surface of the battery unit is fixed in contact with the upper plate; and a lower surface of the battery unit is fixed in contact with the lower plate.

4. The electric work machine according to claim 1, wherein the fixing mechanism has a coupling member; and the coupling member couples the upper plate and the lower plate.

5. The electric work machine according to claim 4, wherein the coupling member couples the upper plate and the lower plate at a position away from the battery unit.

6. The electric work machine according to claim 4, wherein
the upper plate and the lower plate sandwich a plurality of the battery units from the up-down direction;
the plurality of battery units are located in parallel to one direction on the lower plate and aligned in a direction perpendicular to the one direction;
at least any one of the plurality of battery units is located on the lower plate by being shifted from the other battery units in the one direction;
the fixing mechanism has a plurality of the coupling members; and at least any one of the plurality of coupling members is located adjacently to two perpendicularly intersecting surfaces of the two battery units that are located by being shifted in the one direction on the lower plate, viewed from above.

7. The electric work machine according to claim 1, wherein
the fixing mechanism further has a positioning member fixed on the lower plate; and
the positioning member is located on the lower plate in contact with a bottom of any surface of the battery unit.

8. The electric work machine according to claim 1, further comprising:
electrical components disposed on the upper plate.

9. An electric work machine, comprising:
an electric motor;
a machine-body frame;
a battery unit that stores electric power to drive the electric motor; and
a fixing mechanism that fixes the battery unit to the machine-body frame, wherein the fixing mechanism has:
an upper plate and a lower plate that sandwich the battery unit from an up-down direction; and
a support portion that supports the lower plate on the machine-body frame;
wherein the fixing mechanism has a coupling member; and the coupling member couples the upper plate and the lower plate;
wherein
the upper plate and the lower plate sandwich a plurality of the battery units from the up-down direction;
the plurality of battery units are located in parallel to one direction on the lower plate and aligned in a direction perpendicular to the one direction;
at least any one of the plurality of battery units is located on the lower plate by being shifted from the other battery units in the one direction;
the fixing mechanism has a plurality of the coupling members; and at least any one of the plurality of coupling members is located adjacently to two perpendicularly intersecting surfaces of the two battery units that are located by being shifted in the one direction on the lower plate, viewed from above;
the fixing mechanism has a first coupling member, a second coupling member, and a third coupling member as the coupling members; and
the first coupling member, the second coupling member, and the third coupling member are located away from each other along an outer periphery surrounding a plurality of the battery units, viewed from above.

10. The electric work machine according to claim 9, wherein a plurality of the battery units are located on the lower plate in parallel to a left-right direction as the one direction and aligned in a front-back direction perpendicular to the one direction;

the first coupling member is located in front of a battery unit located at the most front among a plurality of the battery units;

the second coupling member is located behind the first coupling member and opposing each side surface of two or more adjacent battery units; and the third coupling member is located behind the second coupling member, and with the plurality of battery units interposed between the first coupling member and the third coupling member.

\*  \*  \*  \*  \*